(12) United States Patent
Maeyama et al.

(10) Patent No.: US 11,150,358 B2
(45) Date of Patent: Oct. 19, 2021

(54) RADIATION DOSIMETRY SOL OR GEL AND RADIATION DOSIMETER COMPRISING SAME AS MATERIAL FOR RADIATION DOSIMETRY

(71) Applicants: RIKEN, Wako (JP); THE KITASATO INSTITUTE, Tokyo (JP); NISSAN CHEMICAL CORPORATION, Tokyo (JP)

(72) Inventors: Takuya Maeyama, Sagamihara (JP); Daniel Antonio Sahade, Funabashi (JP); Takaoki Takanashi, Wako (JP)

(73) Assignees: RIKEN, Wako (JP); THE KITASATO INSTITUTE, Tokyo (JP); NISSAN CHEMICAL CORPORATION, Tokyo (JP)

( * ) Notice: Subject to any disclaimer, the term of this patent is extended or adjusted under 35 U.S.C. 154(b) by 14 days.

(21) Appl. No.: 16/753,244

(22) PCT Filed: Oct. 1, 2018

(86) PCT No.: PCT/JP2018/036694
§ 371 (c)(1),
(2) Date: Apr. 2, 2020

(87) PCT Pub. No.: WO2019/069853
PCT Pub. Date: Apr. 11, 2019

(65) Prior Publication Data
US 2020/0333474 A1    Oct. 22, 2020

(30) Foreign Application Priority Data
Oct. 2, 2017  (JP) .............................. JP2017-193001

(51) Int. Cl.
*G01T 1/105*    (2006.01)
*C09K 11/06*    (2006.01)
(Continued)

(52) U.S. Cl.
CPC .............. *G01T 1/105* (2013.01); *C09K 11/06* (2013.01); *G01N 21/64* (2013.01); *G01T 1/04* (2013.01)

(58) Field of Classification Search
CPC .................................. G01T 1/105; G01T 1/04
See application file for complete search history.

(56) References Cited

U.S. PATENT DOCUMENTS

2017/0212249 A1   7/2017  Azar et al.
2017/0350989 A1   12/2017 Maeyama et al.

FOREIGN PATENT DOCUMENTS

WO   2016/016261 A1   2/2016
WO   2016/098888 A1   6/2016

OTHER PUBLICATIONS

Oct. 9, 2020 Office Action issued in European Patent Application No. 18864654.1.
(Continued)

*Primary Examiner* — Edwin C Gunberg
(74) *Attorney, Agent, or Firm* — Oliff PLC

(57) ABSTRACT

A radiation dosimetry sol or gel, and a radiation dosimeter containing the sol or the gel as a material for radiation dosimetry. A radiation dosimetry sol or gel including a compound (A) having an excitation light-induced fluorescence property that is changed by a radiolysis product of water; and a silicate salt (B). A radiation dosimetry sol or gel including a compound (A) having an excitation light-induced fluorescence property that is changed by a radiolysis product of water; a silicate salt (B); a water-soluble organic polymer (C) having an organic acid salt structure or an organic acid anion structure; and a dispersant (D) for the silicate salt (B). A radiation dosimeter including, as a material for radiation dosimetry, the above-mentioned radiation dosimetry sol or gel.

9 Claims, 6 Drawing Sheets

(51) Int. Cl.
*G01N 21/64* (2006.01)
*G01T 1/04* (2006.01)

(56) References Cited

OTHER PUBLICATIONS

Watanabe et al., "Three-Dimensional Radiation Dosimetry Using Polymer Gel and Solid Radiochromic Polymer: From Basics to Clinical Applications," World Journal of Radiology, Mar. 28, 2017, vol. 9, No. 3, pp. 112-125.
Matthews, "Aqueous Chemical Dosimetry," International Journal of Applied Radiation and Isotopes, 1982, vol. 33, pp. 1159-1170.
Yao, "3D Radiation Dosimetry Using a Radio-Fluorogenic Gel," Delft University of Technology, 2007.
Sandwall et al., "Measuring the Photon Depth Dose Distribution Produced by a Medical Linear Accelerator in a Water-Equivalent Radio-Fluorogenic Gel," Journal of Radioanalytical and Nuclear Chemistry, 2016, vol. 307, pp. 2505-2508.
Benevides et al., "Evaluation of Fluorescent Dye Degradation Indirectly Induced by X-Ray Ionizing Radiation," Applied Optics, Aug. 1, 2015, vol. 54, No. 22, pp. 6935-6939.
Hayashi et al., "Polymer Gel Dosimeter," Radiation Chemistry, 2012, No. 93, pp. 23-30.
Papadopoulos et al., "Radiochemiluminescence of Acridones and Alkyl Acridines," Journal of Photochemistry and Photobiology A: Chemistry, 1998, vol. 115, pp. 137-142.
Nov. 27, 2018 International Search Report issued in International Patent Application No. PCT/JP2018/036694.
Nov. 27, 2018 Written Opinion issued in International Patent Application No. PCT/JP2018/036694.
Yao, "3D Radiation Dosimetry Using a Radio-Fluorogenic Gel," Delft University of Technology, 2017.

(a)

(b)

RADIATION DOSIMETRY SOL OR GEL AND RADIATION DOSIMETER COMPRISING SAME AS MATERIAL FOR RADIATION DOSIMETRY

TECHNICAL FIELD

The present invention relates to a radiation dosimetry sol or gel, and a radiation dosimeter containing the sol or the gel as a material for radiation dosimetry. More particularly, the present invention relates to a radiation dosimetry sol or gel used for measurement of a three-dimensional dose distribution, and a radiation dosimeter containing the sol or the gel as a material for radiation dosimetry.

BACKGROUND ART

A gel dosimeter is a three-dimensional dosimeter utilizing radiation-induced chemical reactions. After radiation exposure to a gel dosimeter, a reaction product retained in the gel is scanned with a three-dimensional scanner, such as a nuclear magnetic resonance imaging system (MRI) or an optical CT system (OCT), and the resultant images are converted into a dose distribution. Since the gel consists largely of water and has a composition similar to that of a living body, a gel dosimeter is expected to be used as a tool for verifying a complex three-dimensional dose distribution planned particularly in radiation therapy.

Typically known gel dosimeters capable of measuring a three-dimensional dose distribution include a Fricke gel dosimeter and a polymer gel dosimeter. A Fricke gel dosimeter is prepared by gelation of a solution (an aqueous solution containing ferrous sulfate) of a Fricke dosimeter known as a liquid chemical dosimeter, and utilizes absorbed dose-dependent enhancement of oxidation reaction (from divalent to trivalent) of iron (coloring) in association with radiation exposure. Meanwhile, a polymer gel dosimeter is prepared by dispersion of a monomer in a gel, and utilizes dose-dependent production of a polymer (polymerization reaction) upon radiation exposure (Non-Patent Document 1).

A gel dosimeter is mainly composed of a radiation-sensitive compound, a gelator, and water (solvent). Since water accounts for 70% to about 90% of the entire gel dosimeter, radiolysis of water occurs first among radiation-induced chemical reactions in the gel. Water decomposition radicals generated during the radiolysis cause oxidation reaction or polymerization reaction. The concentration of generated water decomposition radicals is only about several µM relative to an absorbed dose of 10 Gy. In the aforementioned gel dosimeter, an increase in sensitivity is based on the progress of a chain reaction from one water decomposition radical. Particularly in a polymer gel dosimeter capable of detection at a dose of several Gy, chain polymerization reaction proceeds for at least about one day after radiation exposure, in contrast to reaction with water decomposition radicals completed within several microseconds after the radiation exposure. Thus, such a gel dosimeter does not allow reliable reading of dose distribution information immediately after the radiation exposure.

In recent years, attempts have been made to develop an easy-to-handle and highly sensitive gel dosimeter; specifically, a highly sensitive gel dosimeter containing a fluorescent probe. A fluorescent probe can be quantified with a fluorescence spectrophotometer even at a level of several nM. Since spectrophotometry used in OCT measurement is used for quantification of a product on the order of µM, a 1,000-fold increase in sensitivity can be expected at a rough estimate. In fact, it has been reported that detection at several mGy can be achieved with an aqueous solution dosimeter containing a fluorescent probe (Non-Patent Document 2).

In the development of a gel dosimeter using fluorometry, a radio-fluorogenic (RFG) gel dosimeter has been reported which generates a fluorescent substance after polymerization reaction. It has been reported that the RFG gel dosimeter depends on a radiation dose rate similar to the case of a polymer gel dosimeter utilizing polymerization reaction (Non-Patent Document 3). A fluorescent gel dosimeter containing a coumarin derivative has been reported. A fluorescent gel dosimeter containing a coumarin derivative has been established as a chemical dosimeter (aqueous solution dosimeter) of the highest sensitivity, since the coumarin derivative produces a strong fluorescent substance after reaction with OH radicals generated by radiolysis of water. However, a fluorescent gel dosimeter containing an organic gel (e.g., gelatin) does not achieve an expected high sensitivity (Non-Patent Document 4). There has also been reported a gel dosimeter utilizing color fading reaction of a fluorescent substance (e.g., rhodamine) caused by radiation. The gel dosimeter requires a high dose of several hundreds of Gy for measurement (Non-Patent Document 5).

PRIOR ART DOCUMENTS

Non-Patent Documents

Non-Patent Document 1: Watanabe Y, Warmington L, Gopishankar N: Three-dimensional radiation dosimetry using polymer gel and solid radiochromic polymer: From basics to clinical applications. World journal of radiology 9: 112-25, 2017

Non-Patent Document 2: Matthews R W: Aqueous Chemical Dosimetry. International Journal of Applied Radiation and Isotopes 33: 1159-70, 1982

Non-Patent Document 3: Yao T, 3D Radiation Dosimetry Using a Radio-Fluorogenic gel. Place Delft University of Technology: Delft University of Technology; 2017. (https://pure.tudelft.nl/portal/files/9767609/ thesis.pdf#search=%27%E2%80%9DYao+T%2C+3D+ Radiation+Dosimetry+Using+a+RadioFluorogenic+ gel%E2%80%9D%27)

Non-Patent Document 4: Sandwall P A, Spitz H B, Elson H R, et al: Measuring the photon depth dose distribution produced by a medical linear accelerator in a water-equivalent radio-fluorogenic gel. Journal of Radioanalytical and Nuclear Chemistry 307: 2505-08, 2016

Non-Patent Document 5: Benevides C A, Duarte de Menezes F, de Araujo R E: Evaluation of fluorescent dye degradation indirectly induced by x-ray ionizing radiation. Appl. Opt. 54: 6935-9, 2015

SUMMARY OF THE INVENTION

Problems to be Solved by the Invention

A conventional radiation dosimeter containing a fluorescent probe has a problem in that it is less sensitive to radiation exposure; i.e., hard to achieve high sensitivity.

Thus, an object of the present invention is to provide a sol or gel that can be used as a material for radiation dosimetry; specifically, a radiation dosimetry sol or gel that is highly sensitive to radiation exposure.

Means for Solving the Problems

The present inventors have conducted studies on the use of an inorganic gelator or an organic-inorganic composite gelator, which is less reactive to water decomposition radicals than an organic gelator (e.g., gelatin or agarose), under the assumption that such an organic gelator traps water decomposition radicals to thereby prevent reaction between a radiation-sensitive compound and water decomposition radicals. As a result, the inventors have developed a radiation dosimeter containing, as a material for radiation dosimetry, a sol or gel containing an inorganic gelator or an organic-inorganic composite gelator and a compound having an excitation light-induced fluorescence property that is changed by a radiolysis product of water, and have found that the radiation dosimeter exhibits very high sensitivity to radiation exposure. The present invention has been accomplished on the basis of this finding.

Accordingly, a first aspect of the present invention is a radiation dosimetry sol or gel characterized by comprising a compound (A) having an excitation light-induced fluorescence property that is changed by a radiolysis product of water; and a silicate salt (B).

A second aspect of the present invention is the radiation dosimetry sol or gel according to the first aspect, wherein the compound (A) having an excitation light-induced fluorescence property that is changed by a radiolysis product of water is one or more selected from the group consisting of a coumarin derivative, an aromatic carboxylic acid derivative, an oxazole derivative, and a rhodamine compound.

A third aspect of the present invention is the radiation dosimetry sol or gel according to the first or second aspect, wherein the silicate salt (B) is particles of one or more water-swellable silicate salts selected from the group consisting of smectite, bentonite, vermiculite, and mica.

A fourth aspect of the present invention is the radiation dosimetry sol or gel according to any one of the first to third aspects, characterized by further comprising a water-soluble organic polymer (C) having an organic acid salt structure or an organic acid anion structure; and a dispersant (D) for the silicate salt (B).

A fifth aspect of the present invention is the radiation dosimetry sol or gel according to the fourth aspect, wherein the water-soluble organic polymer (C) is a completely neutralized or partially neutralized polyacrylic acid salt.

A sixth aspect of the present invention is the radiation dosimetry sol or gel according to the fourth or fifth aspect, wherein the dispersant (D) is one or more selected from the group consisting of sodium orthophosphate, sodium pyrophosphate, sodium tripolyphosphate, sodium tetraphosphate, sodium hexametaphosphate, sodium polyphosphate, sodium poly(meth)acrylate, ammonium poly(meth)acrylate, a sodium acrylate/sodium maleate copolymer, an ammonium acrylate/ammonium maleate copolymer, sodium hydroxide, hydroxylamine, sodium carbonate, sodium silicate, polyethylene glycol, polypropylene glycol, sodium humate, and sodium ligninsulfonate.

A seventh aspect of the present invention is the radiation dosimetry sol or gel according to any one of the first to sixth aspects, wherein the radiation dosimetry sol or gel further comprises a pH adjuster.

An eighth aspect of the present invention is a radiation dosimeter comprising, as a material for radiation dosimetry, the radiation dosimetry sol or gel according to any one of the first to seventh aspects.

A ninth aspect of the present invention is the radiation dosimeter according to the eighth aspect, wherein the radiation dosimeter is used for an optical CT system.

Effects of the Invention

The radiation dosimetry sol or gel of the present invention exhibits higher sensitivity to radiation exposure than, for example, gelatin or agarose, which is widely used in conventional radiation dosimeters.

The radiation dosimetry sol or gel of the present invention can be produced from industrially readily available raw materials only by mixing of the raw materials at room temperature without the need for heating. Thus, the radiation dosimetry sol or gel has a constant quality and is an injectable sol or gel, and can be used as a material for radiation dosimetry in a radiation dosimeter.

MODES FOR CARRYING OUT THE INVENTION

Radiation Dosimetry Sol or Gel

Figure 1:
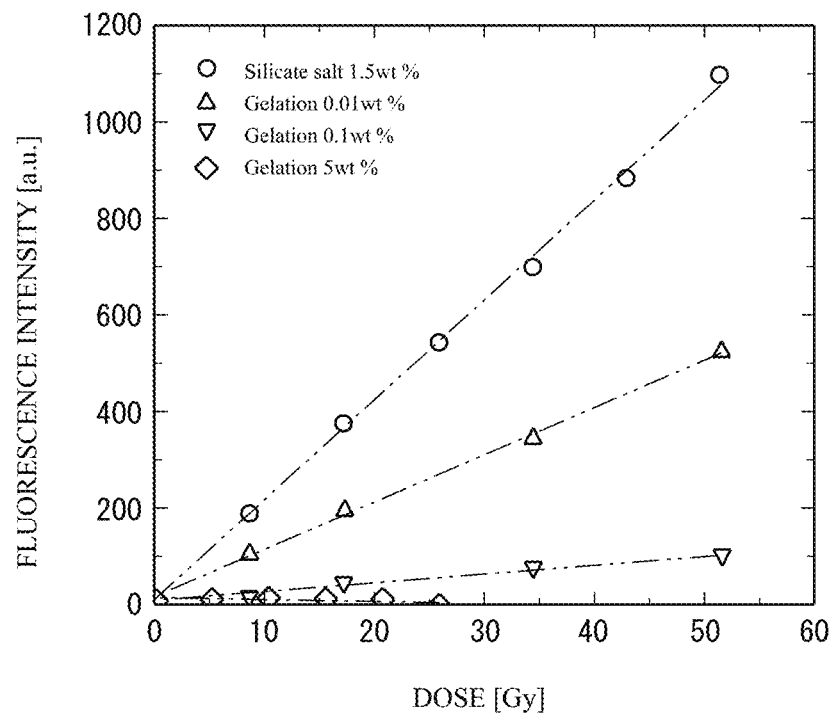
FIG. 1 shows the results of a radiation exposure test in Example 2.

The components of the radiation dosimetry sol or gel of the present invention are a compound (A) having an excitation light-induced fluorescence property that is changed by a radiolysis product of water, and a silicate salt (B); or a compound (A) having an excitation light-induced fluorescence property that is changed by a radiolysis product of water, a silicate salt (B), a water-soluble organic polymer (C) having an organic acid salt structure or an organic acid anion structure, and a dispersant (D) for the silicate salt (B). The radiation dosimetry sol or gel may optionally contain any component other than the aforementioned components, so long as the intended effects of the present invention are not impaired.

The compound (A) having an excitation light-induced fluorescence property that is changed by a radiolysis product of water is a compound that emits excitation light-induced fluorescence by a radiolysis product of water, or a compound that exhibits photobleaching of excitation light-induced fluorescence by a radiolysis product of water.

Component (A): Compound Having Excitation Light-Induced Fluorescence Property Changed by Radiolysis Product of Water The radiation dosimetry sol or gel of the present invention contains a compound (A) having an excitation light-induced fluorescence property that is changed by a radiolysis product of water. Thus, a radiation dosimeter containing, as a material for radiation dosimetry, the radiation dosimetry sol or gel of the present invention serves as a fluorescent sol or gel dosimeter.

The compound (A) having an excitation light-induced fluorescence property that is changed by a radiolysis product of water is a compound whose excitation light-induced fluorescence property is changed through reaction between the compound and reactive oxygen species (e.g., hydroxyl radicals and superoxide radicals) generated by radiation exposure to water. Examples of the compound include a compound that emits excitation light-induced fluorescence by a radiolysis product of water, and a compound that exhibits photobleaching of excitation light-induced fluorescence by a radiolysis product of water.

The compound that emits excitation light-induced fluorescence by a radiolysis product of water may be a fluorescent probe that emits excitation light-induced fluorescence by a radiolysis product of water. The compound that exhibits photobleaching of excitation light-induced fluorescence by a radiolysis product of water may be a fluorescent dye.

Examples of the compound (A) having an excitation light-induced fluorescence property that is changed by a radiolysis product of water include a coumarin derivative, an aromatic carboxylic acid derivative, an oxazole derivative, a rhodamine compound, an acridine compound, a coumestrol compound, a fluorescein compound, a pyrene compound, a stilbene compound, a resorufin compound, an eosin compound, a xanthan compound, a naphthalimide compound, and a polymethine compound. Of these, preferred are a coumarin derivative, an aromatic carboxylic acid derivative, an oxazole derivative, and a rhodamine compound.

The compound (A) having an excitation light-induced fluorescence property that is changed by a radiolysis product of water used in the present invention may be a single species or a combination of two or more species.

The coumarin derivative is a compound having a coumarin skeleton of the following Formula (1).

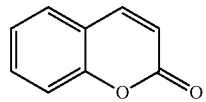

(1)

Examples of the coumarin derivative include, but are not particularly limited to, coumarin, coumarin-3-carboxylic acid, 3-aminocoumarin, umbelliferone (7-hydroxycoumarin), and umbelliferone-3-carboxylic acid (7-hydroxycoumarin-3-carboxylic acid).

Examples of the aromatic carboxylic acid derivative include, but are not particularly limited to, benzoic acid, terephthalic acid, pyromellitic acid, trimellitic acid, 3-(4-hydroxyphenyl)propionic acid, 1-naphthalene acid, and 2-naphthalene acid.

Examples of the oxazole derivative include, but are not particularly limited to, 2,5-diphenyloxazole and 2-(1-naphthyl)-5-phenyloxazole.

Examples of the rhodamine compound include, but are not particularly limited to, rhodamine B, rhodamine 6G, and rhodamine 123.

In addition to the above-exemplified compounds, the present invention may also involve the use of any of the following compounds, each of which is widely known as a compound having an excitation light-induced fluorescence property that is changed by a radiolysis product of water. The following compounds include compounds classified as the aforementioned coumarin derivative, aromatic carboxylic acid derivative, oxazole derivative, and rhodamine compound; however, this does not mean that the following compounds do not apply to the coumarin derivative, etc. described above: 2-hydroxybiphenyl, fluram, fluoresceinamine, anthracene, 1,2-bis(2-aminophenoxy)ethane-N,N,N',N'-tetraacetic acid tetrasodium salt, phenanthrene, anthracene-9-carboxylic acid, phthaldialdehyde, 2',7'-dichlorofluorescein diacetate, 1-ethylnaphthalene, 9-fluorenylmethyl carbazate, triphenylene, naphthalene, phenanthridine, dihydrofluorescein diacetate, p-terphenyl, 3-(4-hydroxyphenyl)propionic acid, 1,2-bis(2-aminophenoxy)ethane-N,N,N',N'-tetraacetic acid, 1-arginine-4-methyl-7-coumarinylamide hydrochloride, trioxsalen, p-quaterphenyl, 5(6)-carboxyfluorescein diacetate N-succinimidyl ester, fluorescein diacetate, 5(6)-carboxyfluorescein diacetate, 5(6)-carboxy-2',7'-dichlorofluorescein diacetate n-succinimidyl ester, 2-ethylnaphthalene, 4-nitrophenylphosphoric acid disodium salt, 5-methoxypsoralen, 3,3-dimethyl-2-(4-dimethylaminostyryl)-1-octadecylindolium perchlorate, 4-methylumbelliferyl palmitate, 4-methylumbelliferyl enanthate, 4-methylumbelliferyl oleate, 4-methylumbelliferyl acetate, 4-methylumbelliferyl butyrate, 4-methylumbelliferyl-n-acetyl-α-d-neuramic acid sodium salt dihydrate, N,N'-bis(salicylidene)ethylenediamine, 4-methylumbelliferyl-β-d-galactopyranoside, 4-methylumbelliferyl-β-d-glucuronide trihydrate, 4-methylumbelliferyl-β-d-glucopyranoside, 4-methylumbelliferyl-n-acetyl-β-d-glucosaminide dihydrate, 4-methylumbelliferyl-α-d-glucopyranoside, 4-methylumbelliferyl-α-d-galactopyranoside, 8-nonanoyloxypyrene-1,3,6-trisulfonic acid trisodium salt, 6-(p-toluidino)-2-naphthalenesulfonic acid, 6-(p-toluidino)-2-naphthalenesulfonic acid sodium salt, 4-methylumbelliferyl phosphate, 4-methylumbelliferyl phosphate disodium salt, 2-naphthol, 7-hydroxy-4-methyl-2(1H)-quinolone, quinine hydrochloride dihydrate, calcein blue, N-succinimidyl-7-hydroxy-4-coumarinyl acetate, 4-methylumbelliferyl-4-guanidinobenzoate hydrochloride monohydrate, 7-ethoxycoumarin, 4-heptadecylumbelliferone, glutaryl-1-phenylalanine-4-methyl-7-coumarinylamide, 4-(trifluoromethyl)umbelliferyl-β-d-glucopyranoside, 4-(trifluoromethyl)umbelliferyl-β-d-galactopyranoside, umbelliferone, 1-alanine-4-methyl-7-coumarinylamide trifluoroacetate, 3,4-dimethylumbelliferone, 1-leucine-4-methyl-7-coumarinylamide hydrochloride, N-succinimidyl-7-hydroxy-4-methyl-3-coumarinyl acetate, firefly luciferin sodium salt, firefly luciferin, trans,trans-1,4-diphenyl-1,3-butadiene, 4-benzylamino-7-nitrobenzofurazan, 4-bromomethyl-7-methoxycoumarin, 1,4-diacetoxy-2,3-dicyanobenzene, 7-methoxy-4-methylcoumarin, 7-ethoxy-4-methylcoumarin, 3-carboxyumbelliferyl-β-d-galactopyranoside, 1-naphthol, 1,5-diaminonaphthalene, 4-methylumbelliferyl-N,N'-diacetyl-β-d-chitobioside monohydrate, 3-carboxyumbelliferyl-β-d-galactopyranoside N-succinimidyl ester, 3-(2-benzothiazolyl)umbelliferone, 3-phenylumbelliferyl phosphate hemipyridine salt, 7-ethoxy-4-(trifluoromethyl)coumarin, 2-(4,4,4-trifluoroacetoacetyl)naphthalene, 7-methoxy-4-(trifluoromethyl)coumarin, 4-methylumbelliferyl sulfate potassium salt, dansylcadaverine, 9,10-bis-N-(2-dimethylaminoethyl) methylaminomethylanthracene bis-zinc chloride complex, 11-(5-dimethylaminonaphthalene-1-sulfonylamino)undecanoic acid, psoralen, dansylhydrazine, N-(iodoacetaminoethyl)-1-naphthylamine-5-sulfonic acid, 4-chloro-7-nitrobenzofurazan, dansyl-1-tyrosyl-1-valyl-glycine trifluoroacetate, 3-(dansylamino)phenylboronic acid, bisbenzimide, 3-phenylumbelliferone, 4-methylumbelliferyl-N,N',N'''-triacetyl-β-chitotrioside, bisbenzimide, 7-methoxycoumarin, 1-methylpyrene, 2-4-(iodoacetamido)phenyl-6-methylbenzothiazole, xanthoxin, 6,7-diethoxy-4-methylcoumarin, 2,3-diaminonaphthalene, 1-pyrenebutyric acid, 4,4'-diisothiocyanatostilbene-2,2'-disulfonic acid disodium salt, 6-(1-pyrenyl)hexanoic acid, 1-pyrenedodecanoic acid, 1-pyrenedecanoic acid, 7-hydroxycoumarin-3-carboxylic acid, pyrene-1-carboxylic acid, 4-dimethylamino-1-naphthyl isothiocyanate, quinine sulfate dihydrate, 6-methoxy-1-(3-sulfopropyl)quinolinium monohydrate, pyrene-1-sulfonic acid sodium salt, pyrene-1-carboxyaldehyde, 3-bromomethyl-7-methoxy-1,4-benzoxazin-2-one, quinine anhydride, 2-amino-5-(6-carboxyindol-2-yl)phenol-N,N,O-tetraacetic acid potassium salt, 4-(6-methyl-2-benzothiazolyl)phenyl isocyanate, 4-methylumbelliferyl-α-d-mannopyranoside, 3-(2-benzoxazolyl)umbelliferyl octanoate, 2-(2-amino-5-methylphenoxy)methyl-6-methoxy-8-aminoquinoline-N,N,N',N'-tetraacetic acid tetrakis(acetoxymethylester), cholesteryl pyrene-L-carboxylate, 1,6-diphenyl-1,3,5-hexatriene-4'-propionic acid, 6,7-dimethoxy-4-(trifluoromethyl)coumarin, 3-(2-benzoxazolyl)umbelliferyl acetate, n-hexadecylpyrene-1-sulfonamide, 1,6-diphenyl-1,3,5-hexatriene, 7-amino-4-methyl-3-coumarinylacetic acid, pyrene, phthalocyanine, 7-amino-4-methylcoumarin, 4-bromomethyl-6,7-dimethoxycoumarin, dihydroethidium, 1-(ethoxycarbonylmethyl)-6-methoxyquinolinium bromide, 1,6-diphenyl-1,3,5-hexatriene-4'-trimethylammonium tosylate, 5-dimethylaminonaphthalene-1-sulfonyl fluoride, 1,8-diaminonaphthalene, 8-aminonaphthalene-1,3,6-trisulfonic acid disodium salt, 1,4-bis(5-phenyl-2-oxazolyl)benzene, N-succinimidyl-7-methoxycoumarin-3-carboxylate, 7-hydroxy-n-octadecylcoumarin-3-carboxamide, 4-(4-dimethylaminostyryl)-1-octadecylpyridinium perchlorate, 4-chloro-7-sulfobenzofurazan ammonium salt, 3-octadecanoylumbelliferone, 7-methoxycoumarin-3-carboxylic acid, 7-hydroxy-4-methyl-3-coumarinylacetic acid, 6,7-dihydroxy-4-methylcoumarin, anthracene-9-carbonylcyanide, hydroxystilbamidine-bis-methanesulfonate, N,N-dimethyl-6-propionyl-2-naphthylamine, fra-2, N,N-dimethyl-6-dodecanoyl-2-naphthylamine, 6,8-diacetoxypyrene-1,3-disulfonic acid disodium salt, 2-(4-dimethylaminostyryl)-3-octadecylbenzothiazolium perchlorate, 7-hydroxy-4-coumarinylacetic acid, 6,7-dihydroxy-4-(trifluoromethyl)coumarin, 8-hexadecanoyloxypyrene-1,3,6-trisulfonic acid trisodium salt, 8-dodecanoyloxypyrene-1,3,6-trisulfonic acid trisodium salt, cholesteryl anthracene-9-carboxylate, 5,6-benzocoumarin-3-carbonyl chloride, 3-acetylumbelliferone, 5-dimethylaminonaphthalene-1-sulfonyl chloride, 8-anilinonaphthalene-1-sulfonic acid ammonium salt, 4-methylumbelliferone(β), 11-(pyrene-1-sulfonylamino)undecanoic acid, 3,3'-diethylthiacarbocyanine iodide, monochlorobimane, trans-4'-hydrazino-2-stilbazole dihydrochloride, 3,6,8-tris (dimethylaminosulfonyl)-1-pyrenyl phosphate pyridine salt, 1-(4-methoxyphenyl)-6-phenylhexatriene, 9,10-anthracenediyl-bis-(methylene)-dimalonic acid, 12-(anthracene-9-carbonyloxy)stearic acid, 8-oleoyloxypyrene-1,3,6-trisulfonic acid trisodium salt, 8-octanoyloxypyrene-1,3,6-trisulfonic acid trisodium salt, 8-butyryloxypyrene-1,3,6-trisulfonic acid trisodium salt, 8-butyryloxy-N,N,N',N',N'',N''-hexamethylpyrene-1,3,6-trisulfonamide, 12-oxo-12-(1-pyrenyl)dodecanoic acid, 4-(trifluoromethyl) umbelliferone, 6,7-dihydroxy-4-coumarinylacetic acid, 3,3'-dioctylthiacarbocyanine iodide, 7-octadecyloxy-3-3-(3-sulfopropyl)-2-benzothiazolyliocoumarin, 3-(2-benzothiazolyl)-7-octadecyloxycoumarin, 3-methyl-2-7-octadecyloxy-3-coumarinylbenzothiazolium methosulfate, 8-tetradecyloxypyrene-1,3,6-trisulfonic acid trisodium salt, dibromobimane, 8-acetoxy-N,N,N',N',N'',N''-hexamethylpyrene-1,3,6-trisulfonamide, n-(7-dimethylamino-4-methyl-3-coumarinyl)maleimide, 7-(diethylamino)coumarin-3,4-dicarboxylic acid, monobromobimane, N-(L-leucyl)-2-aminoacridone, N-(s-benzyl-L-cysteinyl)-2-aminoacridone, n-(n-succinyl-1-phenylalanyl)-2-aminoacridone, n-(n-glutaryl-1-phenylalanyl)-2-aminoacridone, n-(n-tosyl-L-phenylalanyl)-2-aminoacridone, benzofluoranthene, perylene, octadecyl-7-hydroxycoumarin-3-carboxylate, 8-hexadecyloxypyrene-1, 3,6-trisulfonic acid trisodium salt, 8-dodecyloxypyrene-1,3, 6-trisulfonic acid trisodium salt, 8-hydroxypyrene-1,3,6-trisulfonic acid trisodium salt, 7-acetoxy-1-methylquinolinium iodide, 8-octadecyloxypyrene-1,3,6-trisulfonic acid trisodium salt, 8-decyloxypyrene-1,3,6-trisulfonic acid trisodium salt, 8-methoxypyrene-1,3,6-trisulfonic acid trisodium salt, 1-(4-nitrophenyl)-6-phenylhexatriene, 6,8-dihydroxypyrene-1,3-disulfonic acid disodium salt, 7-hydroxy-1-methylquinolinium iodide, protoporphyrin, protoporphyrin-dimethyl ester, 7-(diethylamino)coumarin-3-carboxylic acid, N-succinimidyl-3-(2-benzothiazolyl)umbelliferone-4-carboxylate, 3-(5-chloro-2-benzoxazolyl)-4-cyanoumbelliferyl phosphate pyridine salt, thioflavine, 10-(3-sulfopropyl)acridinium betain, 10-(3-sulfopropyl)acridinium betain, 3-(5-chloro-2-benzoxazolyl)-4-cyanoumbelliferone, N-succinimidyl-7-hydroxycoumarin-3-carboxylate, 7-(diethylamino)coumarin-3-carbohydrazide, 8-(β-d-galactopyranosyloxy)-N,N,N',N',N'',N''-hexamethylpyrene-1,3,6-trisulfonamide, actinomycin, 2-(4-dimethylaminostyryl)-3-methylbenzoxazolium perchlorate, 8-aminopyrene-1,3,6-trisulfonic acid trisodium salt, 2-aminoacridone, phenazine, lucifer yellow dipotassium salt, lucifer yellow dilithium salt, N-succinimidyl-7-(diethylamino)coumarin-3-carboxylate, 7-(diethylamino)coumarin-3-carbonylazide, 8-isothiocyanatopyrene-1,3,6-trisulfonic acid trisodium salt, 9-(2-carboxy-2-cyanvinyl)-julolidine-N-succinimidyl ester, 9-(2,2-dicyanvinyl)-julolidine, 9-(2-carboxy-2-cyanvinyl)-julolidine, 4-nitro-4'-(octadecylamino)stilbene, 4-(dioctadecylamino)-4'-nitrostilbene, proflavine hemisulfate dihydrate, 3-(2-benzothiazolyl)-7-(diethylamino)coumarin-4-carboxylic acid, benzoninhydrin monohydrate, 8-hydroxypyrene-1,3,6-trisulfonic acid trisodium salt, N,N'-dimethyl-9,9'-biacridinium dinitrate, N,N'-dimethyl-9,9'-biacridinium dinitrate, tris(4,7-diphenylphenanthroline)ruthenium (ii) bis-complex, 3-(2-benzothiazolyl)-7-(diethylamino)coumarin, 2-(4-dimethylaminostyryl)-1-methylquinolinium iodide, 11-(7-nitrobenzofurazan-4-ylamino)undecanoic acid, 6-(7-nitrobenzofurazan-4-ylamino)hexanoic acid, 12-(7-nitrobenzofurazan-4-ylamino)dodecanoic acid, resorufin-β-d-galactopyranoside, resorufin phosphate pyridine salt, resorufin-β-d-glucopyranoside, 4-fluoro-7-nitrobenzofurazan, 1,3'-diethyl-4,2'-quinolylthiacyanine iodide, doxorubicin hydrochloride, 4-(4-dipentadecylaminostyryl)-1-methylpyridinium iodide, 2-(4-diethylaminostyryl)-1-methylpyridinium iodide, dimidium bromide, ethidium bromide solution, ethidium bromide, fluorescein-5(6)-carboxamidocaproic acid, 2',7'-bis(2-carboxyethyl)-5(6)-carboxyfluorescein, propidium iodide, 2-(4-dimethylaminostyryl)-1-methylpyridinium iodide, 3,3'-diheptyloxacarbocyanine iodide, 3,3'-diethyloxacarbocyanine iodide, 3,3'-dipropyloxacarbocyanine iodide, 3,3'-dipentyloxacarbocyanine iodide, 3,3'-dioctadecyloxacarbocyanine perchlorate, 3,3'-dihexyloxacarbocyanine iodide, 3,3'-dibutyloxacarbocyanine iodide, 4-(4-diethylaminostyryl)-1-methylpyridinium iodide, fluorescein isothiocyanate dextran, 5(6)-carboxyfluorescein, fluorescein sodium, fluorescein (free acid), fluorescein-5(6)-carboxamidocaproic acid n-succinimidyl ester, 5-carboxy-fluorescein n-succinimidyl ester, 5-carboxy-fluorescein, 6-carboxy-fluorescein, 6-carboxy-fluorescein N-succinimidyl ester, fluorescein-5-thiosemicarbazide, 5-(iodoacetamido)fluorescein, ethidium homodimer, 10-dodecylacridine orange bromide, 10-octadecylacridine orange bromide, calcein disodium salt, 10-nonylacridine orange bromide, fluorescein mercuric acetate, rhodamine 110 chloride, N'-octadecylfluorescein-5-thiourea, fluo 3, 5(6)-carboxy-2',7'-dichlorofluorescein, 3-(2-benzoxazolyl)-4-cyanoumbelliferone, 9-(2-carboxyphenyl)-6-dimethylamino-3-xanthenone sulfate, rhodamine 16 perchlorate, rhodamine 640 perchlorate, rhodamine 590 chloride, eosin, rhodamine 5-3(4)-(aminocarbonyl)-4(3)-carboxybenzenesulfonyl fluoride, rhodamine B 5-3(4)-(aminocarbonyl)-4(3)-carboxybenzenesulfonyl fluoride, eosin yellowish, 5,10,15,20-tetrakis(1-methyl-4-pyridinio)porphyrin tetra (toluene-4-sulfonate), eosin 5-isothiocyanate, rhodamine 19 perchlorate, rhodamine 6G, rhodamine 6G tetrafluoroborate, rhodamine 800, 3,3'-dioctadecylthiacarbocyanine perchlorate, resorufin butyrate, resorufin acetate, 5(6)-carboxytetramethylrhodamine, tetramethylrhodamine B isothiocyanate, rhodamine B isothiocyanate, 6-carboxy-tetramethylrhodamine N-succinimidyl ester, 5-carboxy-tetramethylrhodamine N-succinimidyl ester, 6-carboxy-tetramethylrhodamine, 5-carboxy-tetramethylrhodamine, n-octadecanoyl-nile blue, streptavidin-B-phycoerythrin, biotin-B-phycoerythrin, 1,1'-dioctyl-3,3,3',3'-tetramethylindocarbocyanine iodide, 3,3'-dihexylthiacarbocyanine iodide, 1,1'-dihexyl-3,3,3',3'-tetramethylindocarbocyanine iodide, bengal rose b, tetramethylrhodamine methyl ester perchlorate, 1,1'-dipropyl-3,3,3',3'-tetramethylindocarbocyanine iodide, 1,1'-dipentyl-3,3,3',3'-tetramethylindocarbocyanine iodide, 1,1'-dibutyl-3,3,3',3'-tetramethylindocarbocyanine iodide, tetramethylrhodamine ethyl ester perchlorate, 2-(4-dimethylaminostyryl)-1-octadecylpyridinium perchlorate, 1,1'-dioctadecyl-3,3,3',3'-tetramethylindocarbocyanine perchlorate, rhodamine B, rhodamine B octadecyl ester perchlorate, merocyanine 540, 3,3'-dipropylthiacarbocyanine iodide, sulforhodamine b 5-acid fluoride, 3,3'-dipentylthiacarbocyanine iodide, 1,1'-diethyl-3,3,3',3'-tetramethylindocarbocyanine iodide, 3,3'-dibutylthiacarbocyanine iodide, sulforhodamine B 2-acid fluoride, 3,3'-diheptylthiacarbocyanine iodide, sulforhodamine B acid chloride, sulforhodamine B monosodium salt, rhodamine 101, 5(6)-carboxy-x-rhodamine, sulforhodamine Q 5-acid fluoride, 6-carboxy-X-rhodamin-N-succinimidyl ester, 5-carboxy-x-rhodamin-n-succinimidyl ester, 5-carboxy-X-rhodamine (5-ROX), 6-carboxy-X-rhodamine (6-Rox), 5(6)-carboxy-X-rhodamine N-succinimidyl ester, 3,3'-diethyloxadicarbocyanine iodide, sulforhodamine Q 2-acid fluoride, sulforhodamine 101 acid chloride, sulforhodamine 101 free acid, naphthofluorescein, biotin-c-phycocyanin, cresyl violet perchlorate, 5(6)-carboxynaphthofluorescein N-succinimidyl ester, octaethylporphine, azure A, fluorescent red 646, 1,1'-dioctadecyl-3,3,3',3'-tetramethylindodicarbocyanine perchlorate, mesotetraphenylporphyrin, azure B, 3,3'-dipropylthiadicarbocyanine iodide, 3,3'-diethylthiadicarbocyanine iodide, 4,5-benzo-5'-(n-succinimidyl-oxycarbonylmethyl)-1'-ethyl-3,3,3',3'-tetramethyl-1-(4- sulfobutyl) indodicarbocyanine, 4,5-benzo-5'-(indoacetaminomethyl)-1',3,3,3',3'-pentamethyl-L-(4-sulfobutyl) indodicarbocyanine, 1,1'-bis(4-sulfobutyl)-11-(4-isothiocyanatophenylthio)-3,3,3',3'-tetramethyl-10,12-trimethyleneindotricarbocyanine monosodium salt, 3,3'-diethyloxatricarbocyanine iodide, 3,3'-diethylthiatricarbocyanine iodide, 1,1'-diethyl-4,4'-carbocyanine iodide, 2,5-bis(4-biphenylyl)-1,3,4-oxadiazole, 1-naphthylacetic anhydride, 5-dimethylaminonaphthalene-1-sulfonamide, diphenylmaleic anhydride, carbazole-9-carbonyl chloride, n-(3-fluoranthyl)maleimide, n-4-(2-benzimidazolyl)phenylmaleimide, 6-hydroxy-2-naphthyl disulfide, 2-(2-amino-5-methylphenoxy)methyl-6-methoxy-8-aminoquinoline-N,N,N',N'-tetraacetic acid tetrapotassium salt, 1,2-phenylenediamine dihydrochloride, 1,2-phenylenediamine, 2-(4-maleimidophenyl)-6-methylbenzothiazole, meso-1,2-bis(4-methoxyphenyl)ethylenediamine, N-(L-pyrenyl)maleimide, 1,2-diacetylbenzene, 4',6-diamidino-2-phenylindole dihydrochloride, 4-methylumbelliferyl-α-1-fucopyranoside, isonicotinic hydrazide, 4-hydroxybenzhydrazide, 9-chloromethyl-anthracene, 4-methylumbelliferyl-β-d-lactoside, diphenylborinic anhydride, 4,5-methylenedioxy-1,2-phenylenediamine dihydrochloride, malonamide, Z-glycyl-L-proline-4-methyl-7-coumarinylamide, 1,3-cyclohexanedione, 8-ethoxy-N,N,N',N',N'',N''-hexamethylpyrene-1,3,6-trisulfonamide, 4-(trifluoromethyl)umbelliferyl phosphate disodium salt, 4-(trifluoromethyl)umbelliferyl enanthate, 4-(trifluoromethyl)umbelliferyl oleate, 7-fluorobenzofurazan-4-sulfonic acid ammonium salt, 4-(trifluoromethyl)umbelliferyl butyrate, 2-methoxy-2,4-diphenyl-3(2H)-furanone, 4-(trifluoromethyl)umbelliferyl acetate, 8-methoxy-N,N,N',N',N'',N''-hexamethylpyrene-1,3,6-trisulfonamide, 8-acetoxypyrene-1,3,6-trisulfonic acid trisodium salt, 4-hydrazino-7-nitrobenzofurazan, 5(6)-carboxy-2',7'-dichlorofluorescein diacetate, 4',5'-bis N,N-di(carboxymethyl)aminomethylfluorescein, 2',7'-bis(2-carboxyethyl)-5(6)-carboxyfluorescein tetrakis(acetomethyl) ester, fluorescein dilaurate, fluorescein dibutyrate, fluorescein diacetate-5-isothiocyanate, 5(6)-carboxyeosin diacetate, 5-maleimido-eosin, naphthofluorescein diacetate, 5(6)-carboxynaphthofluorescein diacetate N-succinimidyl ester, 4-dimethylamino-4'-nitrostilbene, 1,4-bis (2-methyl styryl)benzene, 1,4-bis(4-methyl-5-phenyl-2-oxazolyl)benzene, 2-(4-biphenylyl)-5-phenyl-1,3,4-oxadiazole, 2-(4-tert-butylphenyl)-5-(4-biphenylyl)-1,3,4-oxadiazole, 2-(p-tolyl)benzoxazole, 2-(4-biphenylyl)-6-phenylbenzoxazole, 4-hydroxycoumarin, 2,5-diphenyl-1,3,4-oxadiazole, 1,4-bis-2-(5-phenyloxazolyl) benzene, 1,4-bis-2-(4-methyl-5-phenyloxazolyl)benzene, auramine O, safranin, basic blue 12, crystal violet, 3,6-acridinediamine, and 7-diethylamino-4-methycoumarin.

The amount of the compound (A) having an excitation light-induced fluorescence property that is changed by a radiolysis product of water is 0.1 μM to 1,000 μM. When the compound (A) is a compound that exhibits photobleaching of excitation light-induced fluorescence by a radiolysis product of water, the amount of the compound is preferably 0.1 μM to 5 μM, whereas when the compound (A) is a compound that emits excitation light-induced fluorescence by a radiolysis product of water, the amount of the compound is preferably 50 µM to 500 µM.

Component (B): Silicate Salt

Examples of the silicate salt (B) include particles of water-swellable silicate salts, such as smectite, bentonite, vermiculite, and mica. The silicate salt (B) preferably forms a colloid with water or a water-containing liquid serving as a dispersion medium.

The term "smectite" is a generic name of swellable clay minerals including montmorillonite, beidellite, hectorite, saponite, and stevensite.

The silicate salt (B) used in the present invention may be a single species or a combination of two or more species.

Primary particles of the silicate salt are in, for example, a disc-like, plate-like, spherical, particulate, cubic, acicular, rod-like, or amorphous form. For example, the silicate salt is preferably in the form of disk-like or plate-like particles having a diameter of 5 nm to 1,000 nm.

Preferred specific examples of the silicate salt include layered silicate salts. Examples of readily available commercial products include LAPONITE XLG (synthetic hectorite), LAPONITE XLS (synthetic hectorite containing sodium pyrophosphate as a dispersant), LAPONITE XL21 (sodium magnesium fluorosilicate), LAPONITE RD (synthetic hectorite), LAPONITE RDS (synthetic hectorite containing an inorganic polyphosphate salt as a dispersant), and LAPONITE S482 (synthetic hectorite containing a dispersant) manufactured by Rockwood Additives Ltd.; Lucentite SWN (synthetic smectite) and Lucentite SWF (synthetic smectite), Micromica (synthetic mica), and Somasif (synthetic mica) manufactured by Co-op Chemical Co., Ltd.; KUNIPIA (montmorillonite) and SUMECTON SA (synthetic saponite) manufactured by Kunimine Industries Co., Ltd.; and BEN-GEL (a purified product of natural bentonite) manufactured by HOJUN Co., Ltd.

The amount of the silicate salt (B) is 0.01% by mass to 20% by mass, preferably 0.1% by mass to 10% by mass, relative to 100% by mass of the radiation dosimetry sol or gel.

Component (C): Water-Soluble Organic Polymer Having Organic Acid Salt Structure or Organic Acid Anion Structure The water-soluble organic polymer (C) having an organic acid salt structure or an organic acid anion structure is, for example, an organic polymer which has, in a side chain thereof, a salt structure of any of organic acid groups such as a carboxyl group, a sulfonyl group, and a phosphonyl group, or an organic acid anion structure, and which is freely dissolved in water.

Examples of the organic acid salt structure include salts of the aforementioned organic acid groups (e.g., sodium salt, ammonium salt, potassium salt, and lithium salt).

Examples of the organic acid anion structure include structures formed by dissociation of cations from the aforementioned organic acid salts.

Examples of such a water-soluble organic polymer include polymers having a carboxyl group, such as poly (meth)acrylic acid salt, carboxyvinyl polymer salt, and carboxymethyl cellulose salt; polymers having a sulfonyl group, such as polystyrenesulfonic acid salt; and polymers having a phosphonyl group, such as polyvinylphosphonic acid salt.

As used herein, the term "(meth)acrylic acid" refers to both acrylic acid and methacrylic acid.

The water-soluble organic polymer (C) preferably has a linear-chain structure and has neither a branched structure nor a chemically crosslinked structure. The water-soluble organic polymer (C) may be a completely neutralized product having only an organic acid salt structure or a partially neutralized product having both an organic acid salt structure and an organic acid structure, or a mixture of the completely neutralized product and the partially neutralized product.

The water-soluble organic polymer (C) has a weight average molecular weight of preferably 1,000,000 to 10,000,000, more preferably 2,500,000 to 5,000,000, as measured by gel permeation chromatography (GPC) in terms of polyethylene glycol.

The water-soluble organic polymer (C) is preferably a completely neutralized or partially neutralized polyacrylic acid salt, more preferably a completely neutralized or partially neutralized linear-chain polyacrylic acid salt, particularly preferably completely neutralized or partially neutralized linear-chain sodium polyacrylate having a weight average molecular weight of 1,000,000 to 10,000,000, more particularly preferably completely neutralized or partially neutralized linear-chain sodium polyacrylate having a weight average molecular weight of 2,500,000 to 5,000,000. The degree of partial neutralization is 10% to 90%, preferably 30% to 80%.

The amount of the water-soluble organic polymer (C) is 0.01% by mass to 20% by mass, preferably 0.03% by mass to 10% by mass, relative to 100% by mass of the radiation dosimetry sol or gel.

Component (D): Dispersant for Silicate Salt (B)

The dispersant (D) for the silicate salt (B) may be a dispersant or deflocculant used for the purpose of improvement of the dispersibility of a silicate salt or exfoliation of a layered silicate salt. The dispersant (D) may be, for example, a phosphate salt dispersant, a carboxylate salt dispersant, a dispersant acting as an alkali, and an organic deflocculant.

Examples of the phosphate salt dispersant include sodium orthophosphate, sodium pyrophosphate, sodium tripolyphosphate, sodium tetraphosphate, sodium hexametaphosphate, sodium polyphosphate, and sodium etidronate. Examples of the carboxylate salt dispersant include sodium poly(meth)acrylate, ammonium poly(meth)acrylate, sodium acrylate/sodium maleate copolymers, and ammonium acrylate/ammonium maleate copolymers. Examples of the dispersant acting as an alkali include sodium hydroxide and hydroxylamine. Examples of the dispersant that reacts with a polyvalent cation to form an insoluble salt or a complex salt include sodium carbonate and sodium silicate. Examples of the organic deflocculant include polyethylene glycol, polypropylene glycol, sodium humate, and sodium ligninsulfonate.

Preferably, the phosphate salt dispersant is sodium pyrophosphate or sodium etidronate; the carboxylate salt dispersant is sodium poly(meth)acrylate; and the organic deflocculant is polyethylene glycol (e.g., PEG 900).

Of these, more preferred is sodium poly(meth)acrylate, and particularly preferred is low-polymerization sodium polyacrylate having a weight average molecular weight of 1,000 to 20,000.

The low-polymerization sodium polyacrylate is known to act as a dispersant through, for example, a mechanism by which the low-polymerization sodium polyacrylate interacts with silicate salt particles to generate carboxy anion-derived negative charges on the surfaces of the particles, to thereby disperse the silicate salt by charge repulsion.

The amount of the dispersant (D) is 0.001% by mass to 20% by mass, preferably 0.01% by mass to 10% by mass, relative to 100% by mass of the radiation dosimetry sol or gel.

In the present invention, when a dispersant-containing silicate salt is used, the dispersant (D) is not necessarily incorporated.

In the radiation dosimetry sol or gel of the present invention, a preferred combination of the compound (A) having an excitation light-induced fluorescence property that is changed by a radiolysis product of water, and the silicate salt (B) is, for example, a combination wherein the component (A) is a compound that exhibits photobleaching of excitation light-induced fluorescence by a radiolysis product of water in an amount of 0.1 µM to 5 µM, or a compound that emits excitation light-induced fluorescence by a radiolysis product of water in an amount of 50 µM to 500 µM, and the component (B) is water-swellable smectite or saponite in an amount of 0.1% by mass to 10% by mass relative to 100% by mass of the radiation dosimetry sol or gel.

In the case where the radiation dosimetry sol or gel of the present invention contains the component (C) and the component (D), a preferred combination of the compound (A) having an excitation light-induced fluorescence property that is changed by a radiolysis product of water, the silicate salt (B), the water-soluble organic polymer (C), and the dispersant (D) for the silicate salt (B) is, for example, a combination wherein the component (A) is a compound that exhibits photobleaching of excitation light-induced fluorescence by a radiolysis product of water in an amount of 0.1 µM to 5 µM, or a compound that emits excitation light-induced fluorescence by a radiolysis product of water in an amount of 50 µM to 500 µM, the component (B) is water-swellable smectite or saponite in an amount of 0.1% by mass to 10% by mass relative to 100% by mass of the radiation dosimetry sol or gel, the component (C) is completely neutralized or partially neutralized linear-chain sodium polyacrylate having a weight average molecular weight of 2,500,000 to 5,000,000 in an amount of 0.03% by mass to 10% by mass relative to 100% by mass of the radiation dosimetry sol or gel, and the component (D) is sodium pyrophosphate in an amount of 0.01% by mass to 10% by mass, or low-polymerization sodium polyacrylate having a weight average molecular weight of 1,000 to 20,000 in an amount of 0.01% by mass to 10% by mass relative to 100% by mass of the radiation dosimetry sol or gel.

The radiation dosimetry sol or gel of the present invention may contain a pH adjuster, such as glucono-δ-lactone, perchloric acid, sulfuric acid, and sodium chloride.

Production Method for Radiation Dosimetry Sol or Gel

Examples of the production method for the radiation dosimetry sol or gel of the present invention include, but are not particularly limited to, a method involving mixing of the components (A) and (B) and optional addition and mixing of the components (C) and (D), followed by gelation of the resultant mixture; or a method involving mixing of a mixture of at least two components of the components (A) to (D) or an aqueous solution or water-containing solution of the mixture with the remaining component or a mixture of the remaining components or an aqueous solution or water-containing solution of the component or the mixture, followed by gelation of the resultant mixture.

The components (A) and (B) are mixed, and optionally the components (C) and (D) are added and mixed. The mixing of these components can be performed by mechanical or manual stirring, or ultrasonic treatment. In particular, mechanical stirring is preferred. The mechanical stirring can be performed with, for example, a magnetic stirrer, a propeller-type stirrer, a planetary centrifugal mixer, a disper, a homogenizer, a shaker, a vortex mixer, a ball mill, a kneader, or an ultrasonic oscillator. Of these, a planetary centrifugal mixer is preferably used for mixing.

The temperature during mixing is the freezing point to the boiling point of the aqueous solution or the aqueous dispersion, preferably −5° C. to 50° C., more preferably 0° C. to 30° C.

Although the mixture has low strength and is in the form of sol immediately after completion of the mixing, the mixture gelates after being allowed to stand still. The mixture is preferably allowed to stand still for 2 hours to 100 hours. The mixture is allowed to stand still at a temperature of −5° C. to 100° C., preferably 0° C. to 30° C. When the mixture is poured into a mold or subjected to extrusion molding immediately after completion of the mixing and before gelation, the mixture can be formed into a radiation dosimetry gel having any desired shape.

The mixture may be used in the form of sol, so long as it does not lose the ability for radiation dosimetry.

Radiation Dosimeter

The radiation dosimetry sol or gel of the present invention is suitable as a material for radiation dosimetry. Thus, the radiation dosimetry sol or gel can be charged into a container to produce a radiation dosimeter, for example, a phantom. No particular limitation is imposed on the container, so long as it allows radiation to transmit therethrough and has, for example, solvent resistance and airtightness. Preferred examples of the material of the container include glass, acrylic resin, polyester, and ethylene-vinyl alcohol copolymers. After charging of the radiation dosimetry sol or gel into the container, the container may be purged with, for example, nitrogen gas.

The radiation dosimeter of the present invention has high sensitivity to radiation exposure and exhibits high linearity in increase of fluorescence intensity or absorbance with respect to absorbed dose. Thus, the radiation dosimeter can be used as a device for measuring fluorescence intensity or absorbance, for example, a radiation dosimeter for an optical CT system.

EXAMPLES

The present invention will next be described in detail by way of examples, but the present invention is not limited to the following examples.

The following apparatuses and conditions were used for analysis of samples in Examples.

(1) X-Ray Irradiation

Apparatus: industrial X-ray apparatus (Radioflex 250CG, available from Rigaku)

Irradiation conditions: 250 kVp, 8 mA, 1 mm aluminum filter, dose rate of 1.72 Gy/min, and radiation exposure to a sample placed on a circle of 18 cmΦ

(2) Measurement of Fluorescence Intensity

Apparatus: Spectrophotofluorometer F-4500 (available from Hitachi High-Technologies Corporation)

(3) Measurement of Absorbance

Apparatus: UV-VIS Photodiode Array Spectrophotometer MultiSpec-1500 (available from Shimadzu Corporation)

Example 1: Production of Radiation Dosimeter Containing Radiation Dosimetry Sol or Gel as Material for Radiation Dosimetry Firstly, 2.5 g of LAPONITE XLG was added to 97.5 mL of ultrapure water, and the mixture was stirred to prepare a dispersion having a LAPONITE XLG concentration of 2.5 wt %. Separately, 5 mg of coumarin-3-carboxylic acid (CCA) serving as a fluorescent probe was added to a 100-mL flask to prepare a 0.267 mM aqueous fluorescent probe solution. Thereafter, 37.5 mL of the aqueous fluorescent probe solution and 2.5 mL of ultrapure water were added to 60 mL of the LAPONITE XLG dispersion, and then stirred until homogeneity was achieved, to thereby prepare 100 mL of a mixture having final concentrations of LAPONITE XLG and the fluorescent probe of 1.5 wt % and 0.1 mM, respectively. The resultant mixture was charged into a spectrometric cell to prepare a sample for radiation exposure test.

Comparative Example 1: Production of Radiation Dosimeter Containing Gelatin as Material for Radiation Dosimetry Firstly, 2.5 g of gelatin was added to and dissolved in 97.5 mL of ultrapure water by heating to about 50° C., to thereby prepare a 2.5 wt % aqueous gelatin solution. Subsequently, the same procedure as in Example 1 was performed, except that the LAPONITE XLG dispersion was replaced with the aqueous gelatin solution, and that a spectrometric cell in which the mixture to be tested was charged, was allowed to stand still in a refrigerator overnight, to thereby prepare three samples for radiation exposure test (CCA: 0.1 mM, gelatin: 5 wt %, 0.1 wt %, and 0.01 wt %).

Example 2: Radiation Exposure Test

Each of the samples prepared in Example 1 and Comparative Example 1 was irradiated with radiation (X-rays). The results are shown in FIG. 1.

FIG. 1 shows the dose dependence of fluorescence intensity in the case where the concentration of coumarin-3-carboxylic acid was 0.1 mM and the type and concentration of the gelator were varied. The fluorescence intensity of each of the radiation dosimeters (gelator: silicate salt (LAPONITE XLG) 1.5 wt %, gelatin 0.01 wt %, 0.1 wt %, and 5 wt %) was read at around 448 nm; i.e., the maximum wavelength of the fluorescence spectrum, to thereby plot an increase in fluorescence intensity in response to radiation exposure. The test results shown in FIG. 1 were obtained under the same measurement conditions with the spectrophotofluorometer (slit width of excitation: 2.5 nm, slit width of fluorescence: 10 nm, and photomultiplier voltage: 700 V). The difference in slopes corresponds to the difference in sensitivities.

The sample containing 5 wt % gelatin showed no change in fluorescence intensity through radiation exposure even at a dose of less than 25 Gy. A decrease in the amount of gelatin to 0.1 wt % or 0.01 wt % resulted in an increase in fluorescence intensity with respect to dose. The sample containing 0.1 wt % or 0.01 wt % gelatin is substantially in the form of liquid. Thus, the results indicated that it is difficult to apply gelatin to a radiation dosimeter. In contrast, the use of the silicate salt (LAPONITE XLG) even in an amount of 1.5 wt % was found to achieve high dose response.

As is clear from the test results, the radiation dosimetry sol or gel of the present invention exhibits higher sensitivity to radiation exposure than gelatin, which is widely used in conventional gel dosimeters, and also exhibits high linearity in increase of fluorescence intensity with respect to absorbed dose.

Example 3: Production of Radiation Dosimeter

The same procedure as in Example 1 was performed, except that coumarin-3-carboxylic acid used in Example 1 was replaced with benzoic acid serving as a fluorescent probe, to thereby prepare 100 mL of a mixture having final concentrations of LAPONITE XLG and the fluorescent probe of 1.5 wt % and 0.1 mM, respectively. The resultant mixture was charged into a spectrometric cell to prepare a sample for radiation exposure test.

Example 4: Production of Radiation Dosimeter

The same procedure as in Example 1 was performed, except that coumarin-3-carboxylic acid used in Example 1 was replaced with terephthalic acid serving as a fluorescent probe, to thereby prepare 100 mL of a mixture having final concentrations of LAPONITE XLG and the fluorescent probe of 1.5 wt % and 0.1 mM, respectively. The resultant mixture was charged into a spectrometric cell to prepare a sample for radiation exposure test.

Example 5: Production of Radiation Dosimeter

The same procedure as in Example 1 was performed, except that coumarin-3-carboxylic acid used in Example 1 was replaced with trimellitic acid serving as a fluorescent probe, to thereby prepare 100 mL of a mixture having final concentrations of LAPONITE XLG and the fluorescent probe of 1.5 wt % and 0.1 mM, respectively. The resultant mixture was charged into a spectrometric cell to prepare a sample for radiation exposure test.

Example 6: Production of Radiation Dosimeter

The same procedure as in Example 1 was performed, except that coumarin-3-carboxylic acid used in Example 1 was replaced with pyromellitic acid serving as a fluorescent probe, to thereby prepare 100 mL of a mixture having final concentrations of LAPONITE XLG and the fluorescent probe of 1.5 wt % and 0.1 mM, respectively. The resultant mixture was charged into a spectrometric cell to prepare a sample for radiation exposure test.

Example 7: Radiation Exposure Test

Each of the samples prepared in Examples 1 and 3 to 6 was irradiated with X-rays of 1 to 5 Gy, and the fluorescence intensity was evaluated with the spectrophotofluorometer. The results are shown in FIG. 2.

The measurement conditions with the spectrophotofluorometer were as follows: slit width of excitation: 10 nm, slit width of fluorescence: 10 nm, and photomultiplier voltage: 700 V. The excitation wavelength (Ex) and the peak wavelength (Em) of read fluorescence were as follows: coumarin-3-carboxylic acid (Ex: 370 nm, Em: 448 nm), benzoic acid (Ex: 300 nm, Em: 409 nm), terephthalic acid (Ex: 320 nm, Em: 425 nm), trimellitic acid (Ex: 310 nm, Em: 409 nm), and pyromellitic acid (Ex: 310 nm, Em: 433 nm).

Figure 2:
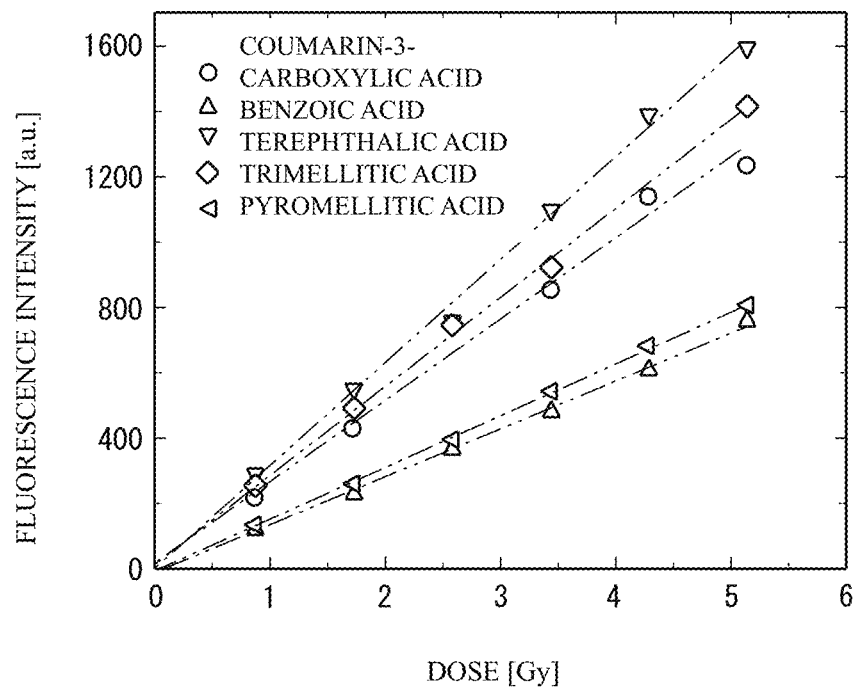
FIG. 2 shows the results of a radiation exposure test in Example 7.

As shown in FIG. 2, all the fluorescent probes; i.e., coumarin-3-carboxylic acid, benzoic acid, terephthalic acid, trimellitic acid, and pyromellitic acid, exhibited linearity in increase of fluorescence intensity with respect to absorbed dose at a low dose of 1 to 5 Gy. In particular, terephthalic acid was found to have the highest sensitivity under the present test conditions.

Example 8: Production of Radiation Dosimeter

The same procedure as in Example 1 was performed, except that coumarin-3-carboxylic acid used in Example 1 was replaced with rhodamine 6G serving as a fluorescent dye, to thereby prepare 100 mL of a mixture having final concentrations of LAPONITE XLG and the fluorescent dye of 1.5 wt % and 1 µM, respectively. The resultant mixture was charged into a spectrometric cell to prepare a sample for radiation exposure test.

Example 9: Production of Radiation Dosimeter

The same procedure as in Example 1 was performed, except that coumarin-3-carboxylic acid used in Example 1 was replaced with umbelliferone-3-carboxylic acid (7-hydroxycoumarin-3-carboxylic acid: 7OH-CCA) serving as a fluorescent dye, to thereby prepare 100 mL of a mixture having final concentrations of LAPONITE XLG and the fluorescent dye of 1.5 wt % and 1 µM, respectively. The resultant mixture was charged into a spectrometric cell to prepare a sample for radiation exposure test.

Example 10: Production of Radiation Dosimeter

The same procedure as in Example 1 was performed, except that coumarin-3-carboxylic acid used in Example 1 was replaced with umbelliferone-3-carboxylic acid serving as a fluorescent dye, to thereby prepare 100 mL of a mixture having final concentrations of LAPONITE XLG and the fluorescent dye of 1.5 wt % and 0.25 µM, respectively. The resultant mixture was charged into a spectrometric cell to prepare a sample for radiation exposure test.

Example 11: Radiation Exposure Test

Each of the samples prepared in Examples 8 to 10 was irradiated with X-rays, and the fluorescence intensity was evaluated with the spectrophotofluorometer. The results are shown in FIG. 3.

Figure 3:
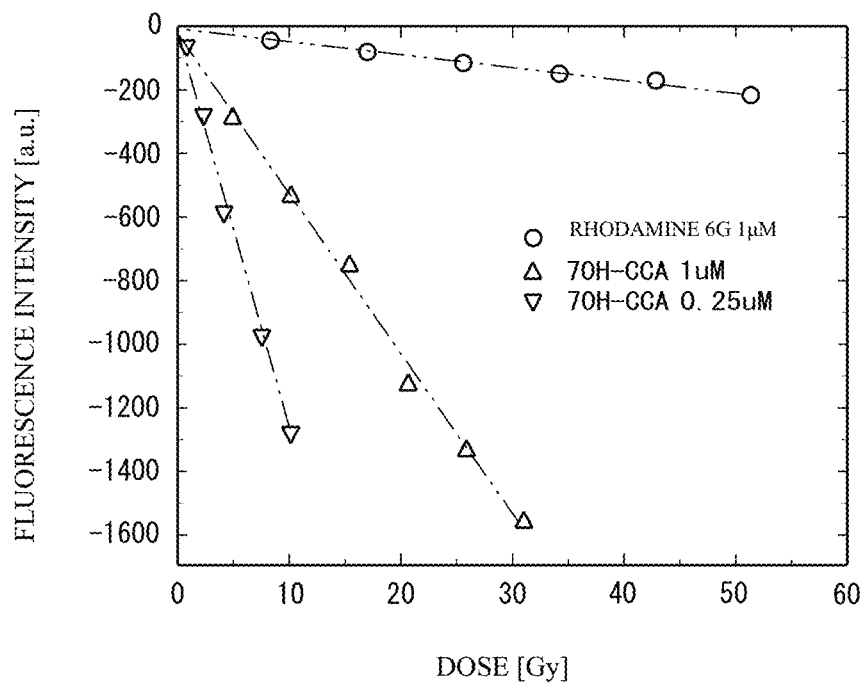
FIG. 3 shows the results of a radiation exposure test in Example 11.

FIG. 3 shows the dose dependence of a reduction in fluorescence intensity by radiation exposure.

The measurement conditions with the spectrophotofluorometer were as follows: 1 µM rhodamine 6G (Ex: 500 nm, Em: 561 nm, slit width of excitation: 2.5 nm, slit width of fluorescence: 5 nm, and photomultiplier voltage: 700 V), 1 µM umbelliferone-3-carboxylic acid (Ex: 370 nm, Em: 446 nm, slit width of excitation: 2.5 nm, slit width of fluorescence: 5 nm, and photomultiplier voltage: 700 V), and 0.25 µM umbelliferone-3-carboxylic acid (Ex: 370 nm, Em: 446 nm, slit width of excitation: 5 nm, slit width of fluorescence: 5 nm, and photomultiplier voltage: 700 V).

Each of the fluorescent dyes showed a reduction in fluorescence intensity in proportion to radiation dose. The fluorescence intensity was measured with the spectrophotofluorometer under different measurement conditions; i.e., the slit width was increased in the case of low initial fluorescence intensity. Thus, a simple comparison cannot be made between the sensitivities of the radiation dosimeters, but a decrease in the initial concentration of umbelliferone-3-carboxylic acid probably enables an increase in percent reduction of fluorescence intensity. Therefore, the amount of the fluorescent dye decomposed by radiation exposure is considered not to depend on the initial concentration of the fluorescent dye. The results suggest that many fluorescent dyes can be applied to the radiation dosimeter of the present invention.

Example 12: Production of Radiation Dosimeter

Firstly, 1.5 g of LAPONITE XLG and 0.4 g of 40% aqueous sodium polyacrylate (molecular weight: 6,000) solution were added to 48.1 g of ultrapure water, and the mixture was stirred to prepare a 3.0 wt % LAPONITE XLG dispersion. Separately, 0.4 g of partially neutralized sodium polyacrylate (degree of neutralization: 35 mol %) was added to 39.6 g of ultrapure water, and the mixture was stirred to prepare an aqueous partially neutralized sodium polyacrylate solution having a solid content of 1.0 wt %.

Separately, 19 mg of coumarin-3-carboxylic acid (CCA) was added to a 100-mL flask to prepare a 1.0 mM aqueous fluorescent probe solution.

Subsequently, 4.0 g of the aqueous fluorescent probe solution and 1.6 g of the 1.0 wt % aqueous partially neutralized sodium polyacrylate solution were added to 32.8 g of ultrapure water, and the mixture was stirred. Thereafter, 1.6 g of the 3.0 wt % LAPONITE XLG dispersion was added to the resultant mixture, and then stirred until homogeneity was achieved, to thereby prepare 40 mL of a mixture. The mixture was charged into a spectrometric cell (1×1×4 cm, four-side transparent) to prepare a sample for radiation exposure test.

Example 13: Production of Radiation Dosimeter

Firstly, 4.0 g of the aqueous fluorescent probe solution prepared in Example 12 and 4.0 g of the 1.0 wt % aqueous partially neutralized sodium polyacrylate solution prepared in Example 12 were added to 28.0 g of ultrapure water, and the mixture was stirred. Thereafter, 4.0 g of the 3.0 wt % LAPONITE XLG dispersion prepared in Example 12 was added to the resultant mixture, and then stirred until homogeneity was achieved, to thereby prepare 40 mL of a mixture. The mixture was charged into a spectrometric cell (1×1×4 cm, four-side transparent) to prepare a sample for radiation exposure test.

Example 14: Radiation Exposure Test

Each of the samples prepared in Examples 12 and 13 was irradiated with X-rays, and the fluorescence intensity was evaluated with the spectrophotofluorometer. The results of the sample of Example 12 are shown in FIG. 4, and the results of the sample of Example 13 are shown in FIG. 5.

The measurement conditions with the spectrophotofluorometer were as follows: slit width of excitation: 10 nm, slit width of fluorescence: 10 nm, and photomultiplier voltage:

700 V. The excitation wavelength (Ex) and the peak wavelength (Em) of read fluorescence were Ex: 370 nm and Em: 446 nm, respectively.

Figure 4:
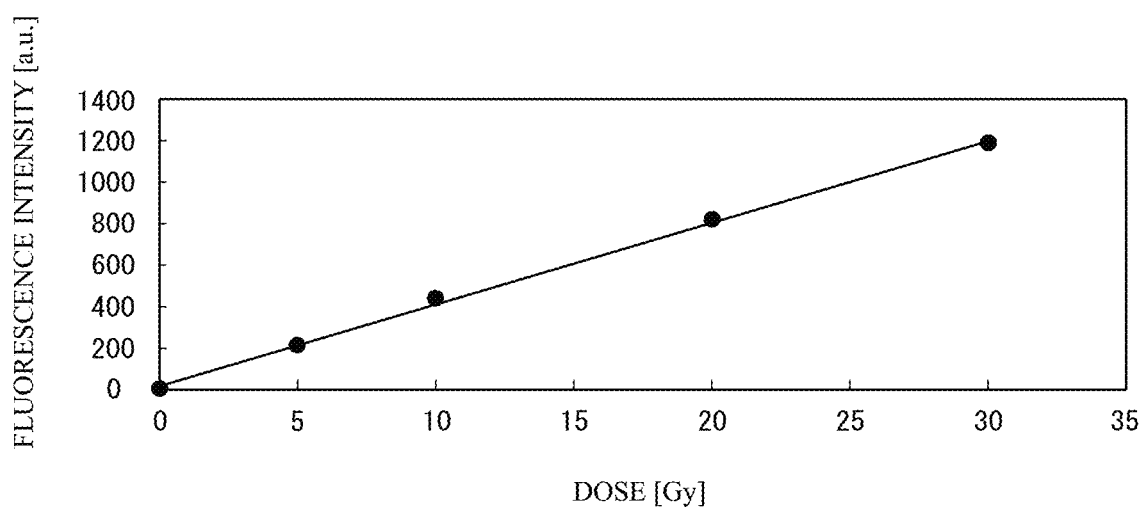
FIG. 4 shows the results of a radiation exposure test in Example 14.
Figure 5:
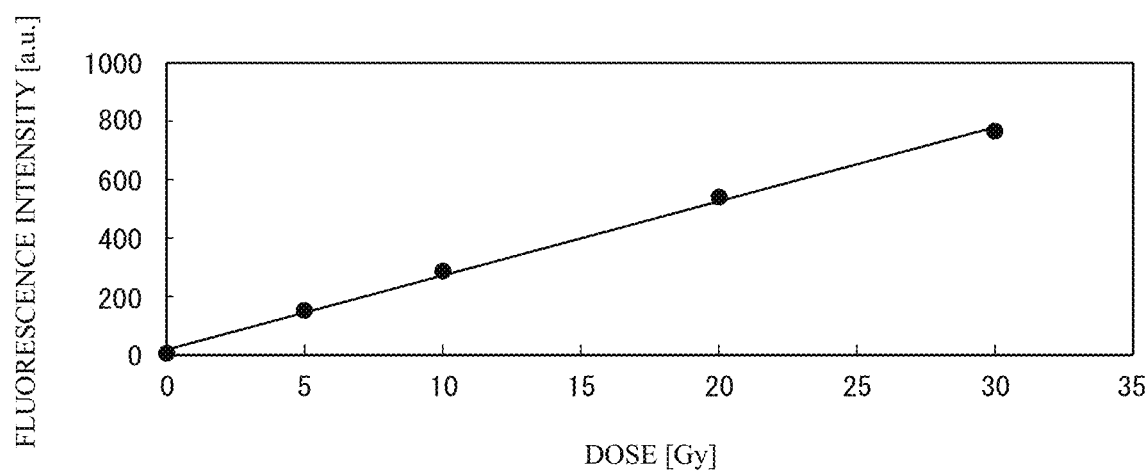
FIG. 5 shows the results of a radiation exposure test in Example 14.

As is clear from FIGS. 1, 4, and 5, the radiation dosimetry sol or gel of the present invention, which contains a compound (A) having an excitation light-induced fluorescence property that is changed by a radiolysis product of water, a silicate salt (B), a water-soluble organic polymer (C) having an organic acid salt structure or an organic acid anion structure, and a dispersant (D) for the silicate salt (B), exhibits higher sensitivity to radiation exposure than gelatin, which is widely used in conventional gel dosimeters, and also exhibits high linearity in increase of fluorescence intensity with respect to absorbed dose.

Example 15: Production of Radiation Dosimeter

The same procedure as in Example 1 was performed, except that coumarin-3-carboxylic acid used in Example 1 was replaced with 2,5-diphenyloxazole serving as a fluorescent dye, to thereby prepare 100 mL of a mixture having final concentrations of LAPONITE XLG and the fluorescent dye of 1.5 wt % and 0.5 µM, respectively. The resultant mixture was charged into a spectrometric cell to prepare a sample for radiation exposure test.

Example 16: Radiation Exposure Test

The sample prepared in Example 15 was irradiated with X-rays, and the fluorescence intensity was evaluated with the spectrophotofluorometer. The results are shown in FIG. 6.

Figure 6:
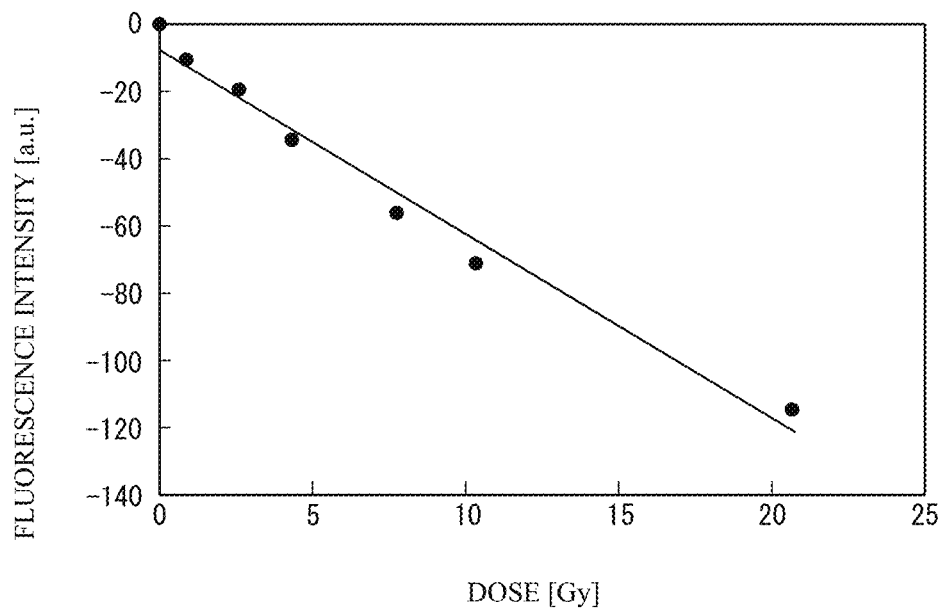
FIG. 6 shows the results of a radiation exposure test in Example 16.

FIG. 6 shows the dose dependence of a reduction in fluorescence intensity by radiation exposure.

The measurement conditions with the spectrophotofluorometer were as follows: Ex: 310 nm, Em: 378 nm, slit width of excitation: 2.5 nm, slit width of fluorescence: 5 nm, and photomultiplier voltage: 700 V.

As shown in FIG. 6, the fluorescent dye 2,5-diphenyloxazole exhibited a reduction in fluorescence intensity in proportion to absorbed dose.

Example 17: Production of Radiation Dosimeter

The same procedure as in Example 1 was performed, except that coumarin-3-carboxylic acid used in Example 1 was replaced with rhodamine 6G serving as a fluorescent dye, to thereby prepare 100 mL of a mixture having final concentrations of LAPONITE XLG and the fluorescent dye of 2.5 wt % and 1 µM, respectively. The resultant mixture was charged into a spectrometric cell to prepare a sample for radiation exposure test.

Example 18: Production of Radiation Dosimeter

The same procedure as in Example 1 was performed, except that coumarin-3-carboxylic acid used in Example 1 was replaced with 7-diethylamino-4-methylcoumarin, to thereby prepare 100 mL of a mixture having final concentrations of LAPONITE XLG and the fluorescent probe of 2.5 wt % and 1 µM, respectively. The resultant mixture was charged into a spectrometric cell to prepare a sample for radiation exposure test.

Example 19: Diffusion Evaluation Test

In order to determine the state of diffusion of a compound derived from the compound (A) by radiation exposure in the radiation dosimeter of the present invention, the sample prepared in Example 17 was photographed one month after radiation exposure, and the sample prepared in Example 18 was photographed two days after radiation exposure. The results are shown in FIG. 7 [FIG. 7(a): the sample of Example 17 one month after radiation exposure, and FIG. 7(b): the sample of Example 18 two days after radiation exposure].

The sample prepared in Example 17 was irradiated at a dose of 140 Gy, and the sample prepared in Example 18 was irradiated at a dose of 100 Gy. Each of these samples was placed in a black box after radiation exposure, and then photographed by using a 365 nm LED light.

Figure 7:
FIG. 7 shows photographs of samples after radiation exposure in a diffusion evaluation test in Example 19 [(a) a sample of Example 17 one month after radiation exposure, and (b) a sample of Example 18 two days after radiation exposure].
Figure 7:
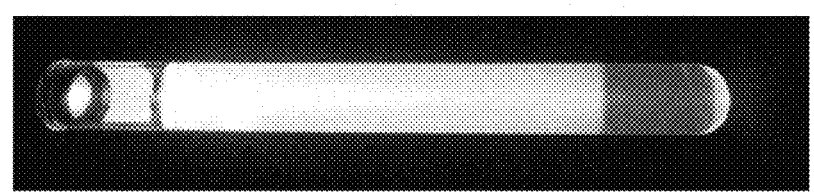

The results shown in FIG. 7 demonstrated that a radiation-exposure-induced contrast is maintained in each of the samples of Examples 17 and 18 even after radiation exposure, and the diffusion of a compound derived from the compound (A) by radiation exposure is suppressed.

Example 20: Production of Radiation Dosimeter

Firstly, 4.0 g of the aqueous fluorescent probe solution prepared in Example 12 and 6.0 g of the 1.0 wt % aqueous partially neutralized sodium polyacrylate solution prepared in Example 12 were added to 24.0 g of ultrapure water, and the mixture was stirred. Thereafter, 6.0 g of the 3.0 wt % LAPONITE XLG dispersion prepared in Example 12 was added to the resultant mixture, and then stirred until homogeneity was achieved, to thereby prepare 40 mL of a mixture. The mixture was charged into a spectrometric cell (1×1×4 cm, four-side transparent) to prepare a sample for radiation exposure test.

Example 21: Production of Radiation Dosimeter

Firstly, 4.0 g of the aqueous fluorescent probe solution prepared in Example 12 and 8.0 g of the 1.0 wt % aqueous partially neutralized sodium polyacrylate solution prepared in Example 12 were added to 20.0 g of ultrapure water, and the mixture was stirred. Thereafter, 8.0 g of the 3.0 wt % LAPONITE XLG dispersion prepared in Example 12 was added to the resultant mixture, and then stirred until homogeneity was achieved, to thereby prepare 40 mL of a mixture. The mixture was charged into a spectrometric cell (1×1×4 cm, four-side transparent) to prepare a sample for radiation exposure test.

Example 22: Radiation Exposure Test

Each of the samples prepared in Examples 20 and 21 was irradiated with radiation (X-rays), and the fluorescence intensity was evaluated with the spectrophotofluorometer. The results are shown in FIG. 8.

Figure 8:
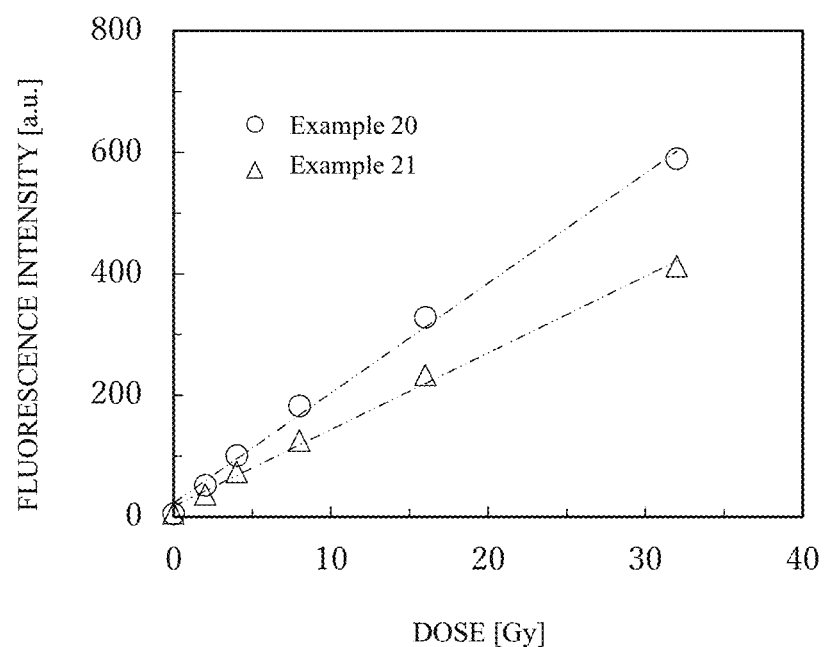
FIG. 8 shows the results of a radiation exposure test in Example 22.

FIG. 8 shows the dose dependence of fluorescence intensity in the case where the concentration of the partially neutralized sodium polyacrylate was varied to 15 wt % or 20 wt %. The fluorescence intensity of each of the radiation dosimeters prepared in Examples 20 and 21 was read at around 446.8 nm; i.e., the maximum wavelength of the fluorescence spectrum, to thereby plot an increase in fluorescence intensity in response to radiation exposure. The test results shown in FIG. 8 were obtained under the same measurement conditions with the spectrophotofluorometer (excitation wavelength: 270.0 nm, slit width of excitation: 5.0 nm, slit width of fluorescence: 5.0 nm, and photomultiplier voltage: 700 V). The difference in slopes corresponds to the difference in sensitivities.

As is clear from FIGS. 1 and 8, the radiation dosimetry sol or gel of the present invention containing the partially neutralized sodium polyacrylate exhibits higher sensitivity to radiation exposure than gelatin, which is widely used in conventional gel dosimeters, and also exhibits high linearity in increase of fluorescence intensity with respect to absorbed dose.

Example 23: Production of Radiation Dosimeter Containing Radiation Dosimetry Sol or Gel as Material for Radiation Dosimetry The same procedure as in Example 1 was performed, except that coumarin-3-carboxylic acid used in Example 1 was replaced with dihydrorhodamine 123 hydrochloride (hereinafter may be referred to as "DHR," available from FUJIFILM Wako Pure Chemical Corporation) serving as a fluorescent probe, to thereby prepare a mixture having final concentrations of LAPONITE XLG and DHR of 1.5 wt % and 0.1 mM, respectively. The resultant mixture was charged into a 5-mL vial and a spectrometric cell to prepare samples for radiation exposure test.

Example 24: Production of Radiation Dosimeter Containing Radiation Dosimetry Sol or Gel as Material for Radiation Dosimetry The same procedure as in Example 1 was performed, except that coumarin-3-carboxylic acid used in Example 1 was replaced with dihydrorhodamine hydrochloride (DHR) serving as a fluorescent probe, to thereby prepare a mixture having final concentrations of LAPONITE XLG and DHR of 2.5 wt % and 0.1 mM, respectively. The resultant mixture was charged into a spectrometric cell and a container for 2D distribution analysis (100 mm×100 mm×5 mm), to prepare samples for radiation exposure test.

Example 25: Radiation Exposure Test

Each of the samples prepared in Examples 23 and 24 was irradiated with radiation (X-rays), and the fluorescence intensity was evaluated with the spectrophotofluorometer. The results are shown in FIG. 9.

Figure 9:
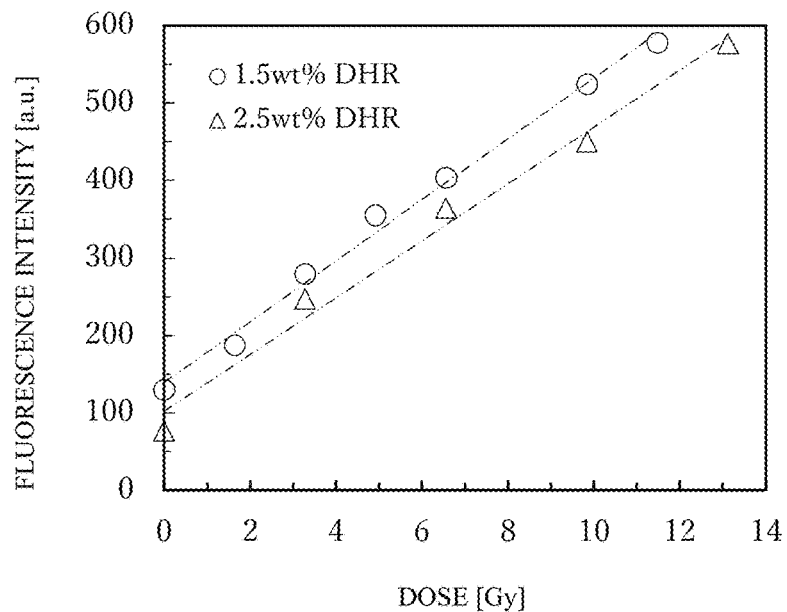
FIG. 9 shows the results of a radiation exposure test in Example 25.

FIG. 9 shows the dose dependence of fluorescence intensity in the case where the fluorescent probe (DHR) was used, and the concentration of the silicate salt (LAPONITE XLG) was varied to 1.5 wt % or 2.5 wt %. The fluorescence intensity of each of the radiation dosimeters prepared in Examples 23 and 24 was read at around 539 nm; i.e., the maximum wavelength of the fluorescence spectrum, to thereby plot an increase in fluorescence intensity in response to radiation exposure. The test results shown in FIG. 9 were obtained under the same measurement conditions with the spectrophotofluorometer (excitation wavelength: 480.0 nm, slit width of excitation: 1.0 nm, slit width of fluorescence: 20.0 nm, and photomultiplier voltage: 700 V). The difference in slopes corresponds to the difference in sensitivities.

As is clear from FIG. 9, the radiation dosimetry sol or gel of the present invention exhibits high sensitivity to radiation exposure, and also exhibits high linearity in increase of fluorescence intensity with respect to absorbed dose.

As is also clear from FIG. 9, the radiation dosimetry sol or gel of the present invention can be used as a radiation dosimetry sol or gel regardless of the concentration of the gelator.

Example 26: Radiation Exposure Test

Figure 10:
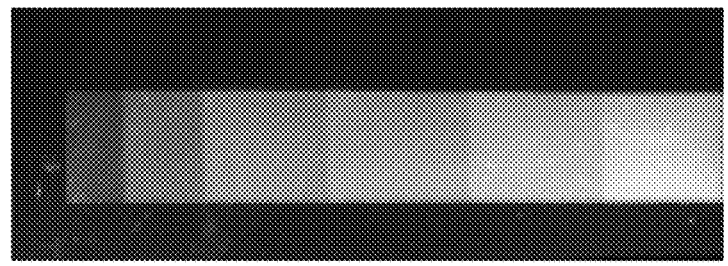
FIG. 10 shows an image obtained from a fluorescent gel scanner in Example 26.
Figure 11:
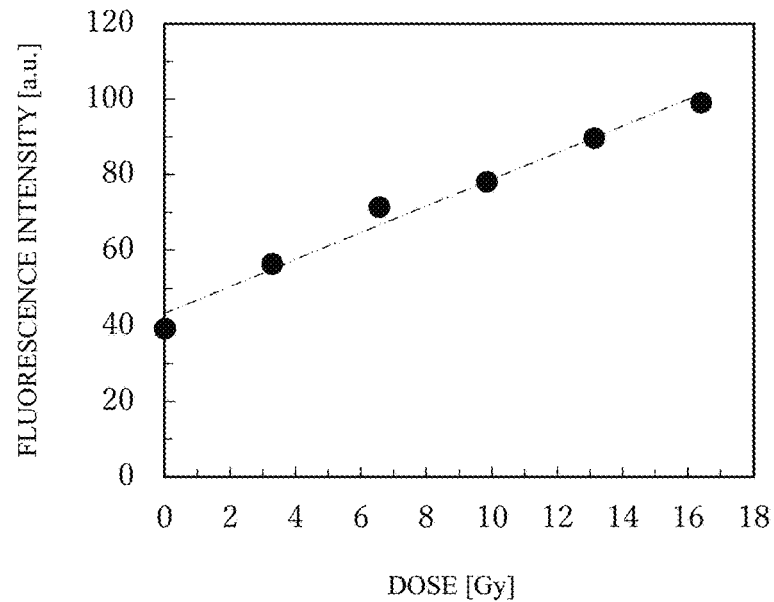
FIG. 11 shows the results of a radiation exposure test in Example 26.

The sample charged into the container for 2D distribution analysis prepared in Example 24 was irradiated with radiation (X-rays), and the fluorescence intensity was evaluated with a fluorescent gel scanner (Model No.: Glite 900 BW, available from Pacific Image Electronics Co., Ltd.). The results are shown in FIGS. 10 and 11. FIG. 10 shows an image obtained from the fluorescent gel scanner after X-ray irradiation. FIG. 11 is a graph showing an increase in fluorescence intensity plotted against radiation dose, wherein each point of data represents the average of fluorescence intensities in the corresponding irradiation region (scanned with the fluorescent gel scanner) of the sample irradiated with X-rays. As is clear from FIG. 11, the radiation dosimetry sol or gel of the present invention exhibits high sensitivity to radiation exposure also in a two-dimensional image, and also exhibits high linearity in increase of fluorescence intensity with respect to absorbed dose.

Example 27: Diffusion Evaluation Test

In order to determine the state of diffusion of a compound derived from the compound (A) by radiation exposure in the radiation dosimeter of the present invention, the sample charged into the spectrometric cell prepared in Example 24 was photographed 73 days after radiation exposure. The results are shown in FIG. 12.

The sample (upper half on the cap side) was irradiated at a dose of 7 Gy. The sample was photographed with the fluorescent gel scanner.

Figure 12:
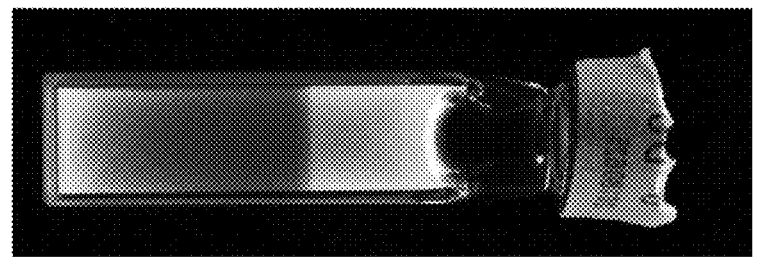
FIG. 12 shows an image of a sample after radiation exposure (after the elapse of 73 days) in a diffusion evaluation test in Example 27.

The results shown in FIG. 12 demonstrated that a radiation-exposure-induced boundary (contrast) is maintained between an irradiation region and a non-irradiation region in the sample of Example 24 even after radiation exposure, and the diffusion of the compound (A) is reduced over time; i.e., the influence of diffusion of the compound (A) is negligible.

Example 28: Radiation Exposure Test (Reading with Spectrophotometer)

The sample prepared in Example 23 was irradiated with radiation (X-rays), and the absorbance was evaluated with a spectrophotometer. The results are shown in FIG. 13.

Figure 13:
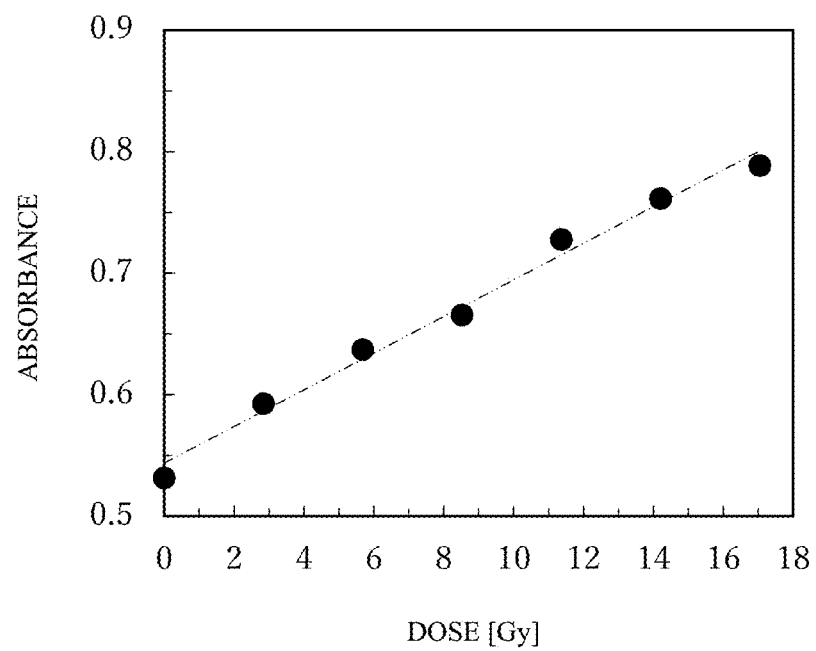
FIG. 13 shows the results of spectroscopic measurement in Example 28.

As shown in FIG. 13, the absorbance of the irradiated sample was measured at a wavelength of 400 nm to 600 nm with a spectrophotometer, and the maximum absorbance was read at around 511 nm, to thereby plot an increase in absorbance against radiation dose.

As is clear from FIG. 13, the radiation dosimetry sol or gel of the present invention exhibits an increase in absorbance in proportion to radiation dose, and the absorbance can be quantified by light absorption measurement. Thus, the radiation dosimetry sol or gel of the present invention can be used in a radiation dosimeter for, for example, an optical CT system.

The invention claimed is:

1. A radiation dosimetry sol or gel characterized by comprising a compound (A) having an excitation light-induced fluorescence property that is changed by a radiolysis product of water; and a silicate salt (B).

2. The radiation dosimetry sol or gel according to claim 1, wherein the compound (A) having an excitation light-induced fluorescence property that is changed by a radiolysis product of water is one or more selected from the group consisting of a coumarin derivative, an aromatic carboxylic acid derivative, an oxazole derivative, and a rhodamine compound.

3. The radiation dosimetry sol or gel according to claim 1, wherein the silicate salt (B) is particles of one or more water-swellable silicate salts selected from the group consisting of smectite, bentonite, vermiculite, and mica.

4. The radiation dosimetry sol or gel according to claim 1, characterized by further comprising a water-soluble organic polymer (C) having an organic acid salt structure or an organic acid anion structure; and a dispersant (D) for the silicate salt (B).

5. The radiation dosimetry sol or gel according to claim 4, wherein the water-soluble organic polymer (C) is a completely neutralized or partially neutralized polyacrylic acid salt.

6. The radiation dosimetry sol or gel according to claim 4, wherein the dispersant (D) is one or more selected from the group consisting of sodium orthophosphate, sodium pyrophosphate, sodium tripolyphosphate, sodium tetraphosphate, sodium hexametaphosphate, sodium polyphosphate, sodium poly(meth)acrylate, ammonium poly(meth)acrylate, a sodium acrylate/sodium maleate copolymer, an ammonium acrylate/ammonium maleate copolymer, sodium hydroxide, hydroxylamine, sodium carbonate, sodium silicate, polyethylene glycol, polypropylene glycol, sodium humate, and sodium ligninsulfonate.

7. The radiation dosimetry sol or gel according to claim 1, wherein the radiation dosimetry sol or gel further comprises a pH adjuster.

8. A radiation dosimeter comprising, as a material for radiation dosimetry, the radiation dosimetry sol or gel according to claim 1.

9. The radiation dosimeter according to claim 8, wherein the radiation dosimeter is used for an optical CT system.

* * * * *